(12) United States Patent
Sauer et al.

(10) Patent No.: US 7,708,677 B2
(45) Date of Patent: May 4, 2010

(54) PLASTIC-COATED ROLLER, ESPECIALLY TENSION ROLLER FOR A BELT DRIVE

(75) Inventors: Christian Sauer, Henfenfeld (DE); Gerhard Prosch, Hoechstadt (DE)

(73) Assignee: Schaeffler KG, Herzogenaurach (DE)

( * ) Notice: Subject to any disclaimer, the term of this patent is extended or adjusted under 35 U.S.C. 154(b) by 218 days.

(21) Appl. No.: 10/583,863

(22) PCT Filed: Nov. 20, 2004

(86) PCT No.: PCT/EP2004/013192

§ 371 (c)(1),
(2), (4) Date: Dec. 1, 2006

(87) PCT Pub. No.: WO2005/064207

PCT Pub. Date: Jul. 14, 2005

(65) Prior Publication Data

US 2007/0108839 A1    May 17, 2007

(30) Foreign Application Priority Data

Dec. 20, 2003 (DE) .............. 103 60 290

(51) Int. Cl.
*F16C 13/00* (2006.01)
(52) U.S. Cl. ................. 492/56; 29/892.11
(58) Field of Classification Search ............... 492/56; 29/892, 892.1, 892.11; 264/328.8, 328.12
See application file for complete search history.

(56) References Cited

U.S. PATENT DOCUMENTS 4,668,209 A    5/1987    Kyoosei et al.
5,948,340 A *  9/1999    Terada et al. ............. 264/328.8

FOREIGN PATENT DOCUMENTS

| DE | 3226419      | 1/1984  |
| DE | 3625800      | 2/1988  |
| DE | 41 26 938 A  | 8/1995  |
| DE | 4499780      | 4/2000  |
| DE | 199 37 681 A | 11/2001 |
| JP | 08025501 A * | 1/1996  |
| JP | 08118396 A * | 5/1996  |
| JP | 10122339 A * | 5/1998  |
| JP | 2002292678 A | 10/2002 |

OTHER PUBLICATIONS

Patent Abstracts of Japan vol. 2003, No. 02, Feb. 5, 2003 -&JP 2002 292678 A (Calsonic Kansei Corp), Oct. 9, 2002 abstract, figures 1, 2.

* cited by examiner

*Primary Examiner*—David P Bryant
*Assistant Examiner*—Sarang Afzali
(74) *Attorney, Agent, or Firm*—Lucas & Mercanti, LLP

(57) ABSTRACT

The invention provides a plastic-sheathed roller, typically a tension roller of plastic for a belt drive. The roller comprises a wheel comprising an inner ring and an outer ring that are connected through radially oriented ribs arranged spaced apart on a periphery and through a central web. The wheel is mounted for rotating through a rolling bearing on a carrier element, while being supported through a running surface on a belt of the belt drive, and injection gates for injection molding are arranged distributed on a lateral surface while being spaced apart angularly non-uniformly from one another.

4 Claims, 2 Drawing Sheets

PLASTIC-COATED ROLLER, ESPECIALLY TENSION ROLLER FOR A BELT DRIVE

FIELD OF THE INVENTION

The invention concerns a plastic-sheathed roller, typically a tension roller of plastic for a belt drive, said roller comprising a wheel comprising an inner ring and an outer ring that are connected through radially oriented ribs arranged spaced apart on a periphery and through a central web, said wheel being mounted for rotating through a rolling bearing on a carrier element, while being supported through a running surface on a belt of the belt drive, and injection gates for injection molding being arranged distributed on a lateral surface.

BACKGROUND OF THE INVENTION

A desired belt tension can be set in a belt drive with the help of a tension roller. Hitherto known plastic tension rollers have flat portions on their running surface that are caused by conditions inherent to their manufacturing methods and their base materials. Instead of the desired, fully cylindrical peripheral surface, flattened portions are formed between the ribs of the tension roller wheel with the result that the belt is periodically tightened in the region of the ribs and relaxed in the intervening regions. This causes a vibration excitation with a concomitant disadvantageous noise development of the belt bearing against the running surface of the tension roller wheel.

In tension rollers known from the documents DE 32 26 419 A1 and DE 36 25 800 A1, a plastic wheel is mounted for rotation on a carrier element. In the configuration of the wheel of these documents, an inner ring is arranged exclusively on the peripheral surface of a rolling-bearing outer ring, and said inner ring is connected to an outer ring through radially oriented ribs that are uniformly distributed on the periphery. The tension roller is supported on the belt through the peripheral surface or running surface of the outer ring of the wheel.

Due to the uniformly spaced ribs and the material-related non-circularity, the peripheral surface of the plastic wheel has uniformly configured flattened portions. In certain speed ranges, such a plastic wheel leads to resonance in the belt drive that intensifies wear and running noise.

To avoid these problems, it has already been suggested in DE 44 99 780 C1 that the successive ribs should enclose different angles with each other relative to a center point of the wheel.

The compact spacing of the ribs results in a substantially cylindrical peripheral surface or running surface of the wheel. The short running surface sections between adjacent ribs therefore result in a negligible non-circularity of the peripheral surface. In addition, due to the different angles between the adjacent ribs, the remaining, extremely minor non-circularity is different in each case, so that the occurrence of resonance in the belt drive is prevented for thus obtaining a noise-optimized belt drive.

However, practice has shown that only a relatively limited damping of disturbing vibrations can be achieved with these measures.

OBJECTS OF THE INVENTION

It is therefore an object of the invention to eliminate the mentioned drawbacks of vibrations in the belt caused by the design of the tension roller and thus provide a belt drive that has a clearly higher degree of noise-damping compared to prior art arrangements.

This and other objects and advantages of the invention will become obvious from the following detailed description.

SUMMARY OF THE INVENTION

The inventive concept is based on the recognition of the fact that the main reason for the excitation of vibrations and the occurrence of noises is not the flattening of the outer ring between the ribs caused by the tightening of the belt but the elevations on the running surface resulting from the fabrication of the plastic wheel. When the plastic material flows together between every two injection gates, a seam is formed in each case centrally between these injection gates and leads to the creation of an elevation at this point. In practice, this elevation is naturally very small, but these regular, small elevations lead, in practice, to a considerable excitation of vibration.

Due to the non-uniform distribution of the injection gates provided by the invention, the elevations on the running surface are likewise non-uniformly distributed so that noise generation, in its turn, is of a much more uncritical nature because no dominant orders exist any longer.

Practice has shown that, due to the inventive non-uniform distribution of the injection gates, a considerably stronger improvement with regard to vibration suppression and noise generation in the belt drive is achieved with such tension rollers than through the already discussed measure of DE 44 99 780 C1.

In a manner known, per se, according to a further embodiment of the invention, a rolling-bearing outer ring is injection-coated, on an outer surface and limited at both front ends, through the inner ring of the wheel.

BRIEF DESCRIPTION OF THE DRAWINGS

Further advantages and details of the invention will be seen from the following description of an example of embodiment of the invention with reference to the appended drawings.

DETAILED DESCRIPTION OF THE DRAWINGS

Figure 1:
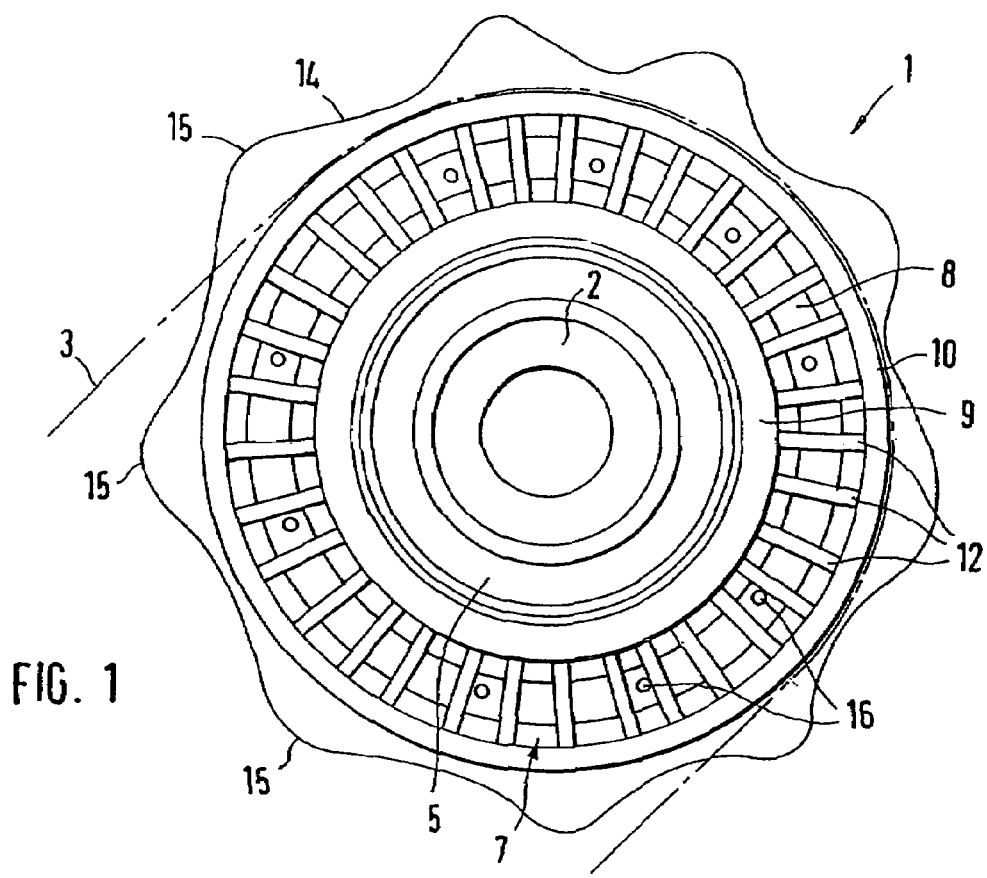
FIG. 1 is a view of a bearing bushing of the invention illustrating, distributed around the bearing bushing and on a strongly exaggerated scale, the elevations that are formed on the running surface during injection molding.
Figure 2:
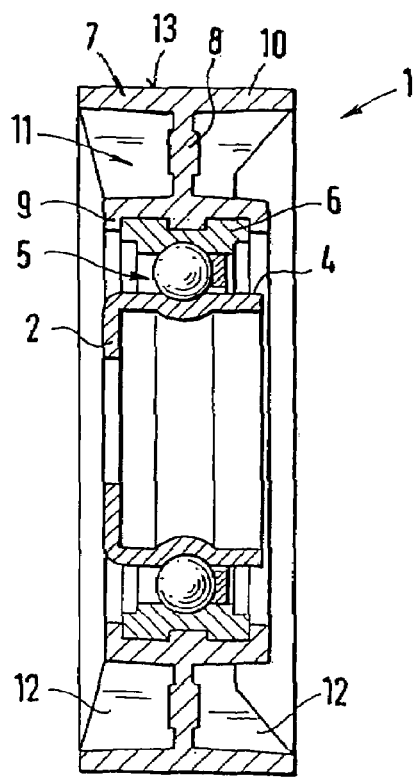
FIG. 2 is a longitudinal section through the tension roller illustrated in FIG. 1.

The tension roller 1 illustrated in FIGS. 1 and 2 comprises a carrier element 2 that is connected, for example, to a tensioning device that serves to tighten a belt 3 of a belt drive. The outer peripheral surface 4 of the pot-shaped carrier element 2 serves to guide a rolling bearing 5 on whose outer ring 6 a wheel 7 is fixed in place. This fixing can be effected, for instance, through the material, to be seen in FIG. 2, injected onto the outer ring 6 of the rolling bearing 5 through the inner ring 9 of the wheel 7. This wheel 7 made of plastic has an approximately double, horizontal H-shaped cross-section comprising a central web 8 that connects said inner ring 9 to an outer ring 10. This structure leads to the formation of U-shaped recesses 11 in which radially oriented ribs 12 are provided for stiffening. The belt 3 bears against a running surface 13 of the outer ring 10. Injection gates for fabricating the wheel 7 by injection molding are identified at 16. These injection gates 16 are arranged along a concentric circle on the central web 8 but at irregular angular spacing from one another. This arrangement of the injection gates along a concentric circle is naturally not absolutely necessary in practice. In place of such a circular arrangement, the injection gates could also be arranged radially offset from one another and, instead of being situated on the central web, they could also be situated on a rib or a shoulder surrounding the rolling-bearing outer ring, or on the running surface.

Due to the flowing-together of the plastic material in the seam between the flow fronts, slight elevations 15 of the running surface, shown extremely exaggerated in FIG. 1 as line 14, are formed between the injection gates 16 due to the fiber orientation.

Through the inventive non-uniform distribution of the injection gates 16 and the corresponding non-uniform distribution of the elevations 15 of the running surface resulting therefrom, resonances due to vibration of the belt drive as a result of these elevations are avoided. Investigations have shown that by implementing the measures provided by the invention, noise generation can be reduced to less than one third of the noises that occur otherwise.

Figure 3:
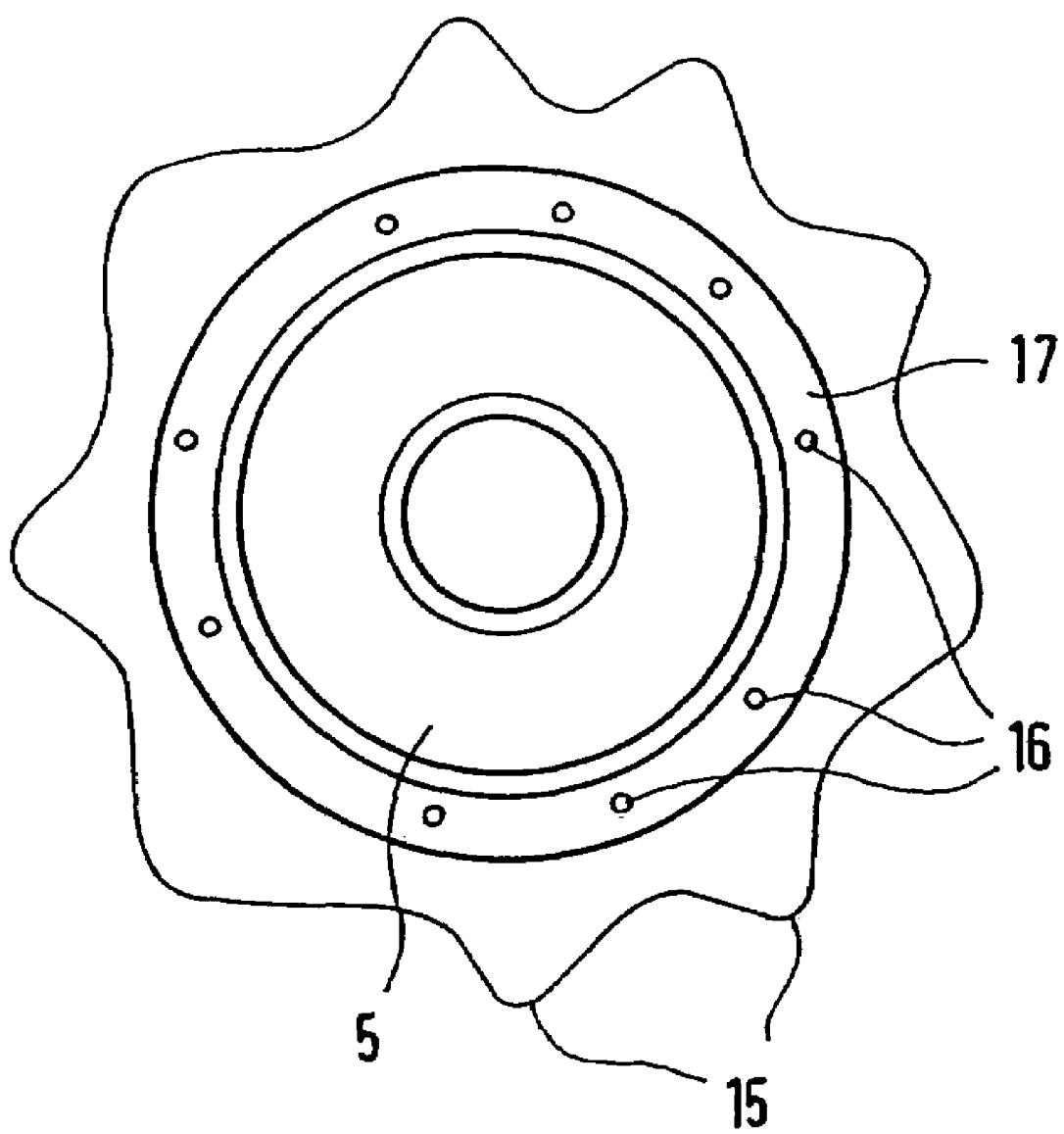
FIG. 3 is a view of a further embodiment of a bearing bushing of the invention without a running wheel and with a bearing directly coated by injection.

FIG. 3 shows, in a view corresponding to that of FIG. 1, a simplified bearing bushing of the invention in which the elevations on the running surface formed during injection molding are again represented on a strongly exaggerated scale. In place of the configuration of a wheel with spokes, inner ring, outer ring and central web, the bearing in this embodiment comprises a simple cylindrical plastic sheathing 17 formed thereon by injection. Similar to the embodiment of FIGS. 1 and 2, the injection gates 16 are angularly offset to one another, so that the elevations 15 formed in the region of the seam between the flow fronts due to the flowing-together of the plastic material are also offset angularly to one another. In this way, resonances that would result from vibration of the belt drive due to these elevations, can be avoided.

REFERENCES

1 Tension roller
2 Carrier element
3 Belt
4 Peripheral surface
5 Rolling bearing
6 Outer ring
7 Wheel
8 Central web
9 Inner ring
10 Outer ring
11 Recesses
12 Ribs
13 Running surface
14 Line
15 Elevations
16 Injection gates
17 Cylindrical plastic sheathing

The invention claimed is:

1. A plastic-sheathed roller, comprising a wheel having an inner ring and an outer ring that are connected through radially oriented ribs arranged spaced apart on a periphery and through a central web, said wheel being mounted for rotating through a rolling bearing on a carrier element, while being supported through a running surface of the outer ring on a belt of the belt drive, and elevations on the running surface, the elevations resulting from injection gates for injection molding being arranged on a lateral surface of the central web, between the inner ring and the outer ring, wherein the injection gates and the elevations are spaced apart angularly non-uniformly from one another.

2. A plastic sheathed roller of claim 1, wherein a rolling-bearing outer ring is injection-coated, on an outer surface and limited at both front ends, through the inner ring of the wheel.

3. A plastic sheathed roller of claim 2, wherein the injection gales are arranged spaced apart along a circle concentric to the axis.

4. A plastic sheathed roller of claim 1, wherein the injection gates are arranged spaced apart along a circle concentric to the axis on the central web.

* * * * *